(12) United States Patent
Hodebourg et al.

(10) Patent No.: US 9,273,786 B2
(45) Date of Patent: Mar. 1, 2016

(54) THREE-WAY VALVE WITH RETURN END-STOP ON THE AIR PATHWAY

(75) Inventors: Grégory Hodebourg, Sartouville (FR); Sébastien Adenot, Pontoise (FR)

(73) Assignee: Valeo Systemes de Controle Moteur, Cergy Pontoise (FR)

( * ) Notice: Subject to any disclaimer, the term of this patent is extended or adjusted under 35 U.S.C. 154(b) by 760 days.

(21) Appl. No.: 13/592,542

(22) Filed: Aug. 23, 2012

(65) Prior Publication Data

US 2013/0047968 A1 Feb. 28, 2013

(30) Foreign Application Priority Data

Aug. 23, 2011 (FR) ...................................... 11 57465

(51) Int. Cl.
| | |
|---|---|
| *F16K 11/085* | (2006.01) |
| *F16K 11/22* | (2006.01) |
| *F16K 31/04* | (2006.01) |
| *F02M 25/07* | (2006.01) |

(52) U.S. Cl.
CPC ............ *F16K 11/22* (2013.01); *F02M 25/0773* (2013.01); *F02M 25/0792* (2013.01); *F02M 25/0793* (2013.01); *F02M 25/0796* (2013.01); *F16K 31/043* (2013.01); *Y10T 137/87684* (2015.04); *Y10T 137/87692* (2015.04)

(58) Field of Classification Search
USPC ................. 137/607, 637, 637.1, 875; 251/77, 251/250.5; 123/568.12, 568.2, 568.23
See application file for complete search history.

(56) References Cited

U.S. PATENT DOCUMENTS

| | | | |
|---|---|---|---|
| 6,267,352 B1 * | 7/2001 | Semeyn et al. | 251/129.12 |
| 7,140,392 B2 * | 11/2006 | Blomquist et al. | 137/637.3 |
| 7,207,545 B2 * | 4/2007 | Kawai et al. | 251/129.11 |
| 7,543,794 B2 * | 6/2009 | Kouzu et al. | 251/129.11 |
| 8,381,520 B2 * | 2/2013 | Leroux et al. | 60/605.2 |
| 8,561,645 B2 * | 10/2013 | Leroux et al. | 137/637.1 |
| 8,862,369 B2 * | 10/2014 | Vitiello et al. | 701/108 |

FOREIGN PATENT DOCUMENTS

| | | |
|---|---|---|
| DE | 42 40 688 A1 | 6/1994 |
| EP | 0903522 A2 | 3/1999 |
| EP | 1 223 373 A2 | 7/2002 |
| WO | 2009/106727 A1 | 9/2009 |

OTHER PUBLICATIONS

French Search Report issued in FR 1157465, mailing date Mar. 20, 2012 (2 pages).

* cited by examiner

*Primary Examiner* — John Fox
(74) *Attorney, Agent, or Firm* — Osha Liang LLP

(57) ABSTRACT

Three-way valve with two flaps comprising common control means (9) for the two flaps and actuation means (12, 13, 50) arranged each to drive, pivotwise, one of the two flaps, from one to the other of its open and closed position of one of the pathways, with a temporal phase-shift, such that, in a first stage the common control means pivot the second flap, the first flap remaining in a waiting position under the action of return means, and in a second stage, said control means, while continuing to pivot the second flap, begin to pivot the first flap, characterized in that said second actuation means (12, 50) comprises a return driving means (71) making it possible to pivot the second flap (5) to its first position under the action of the common control means (9) in the case of a failure of said return means.

10 Claims, 6 Drawing Sheets

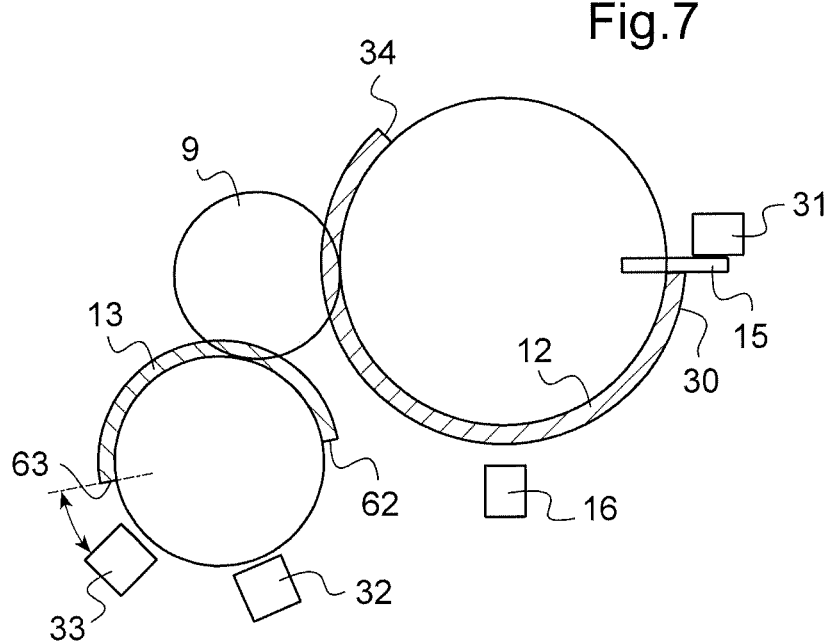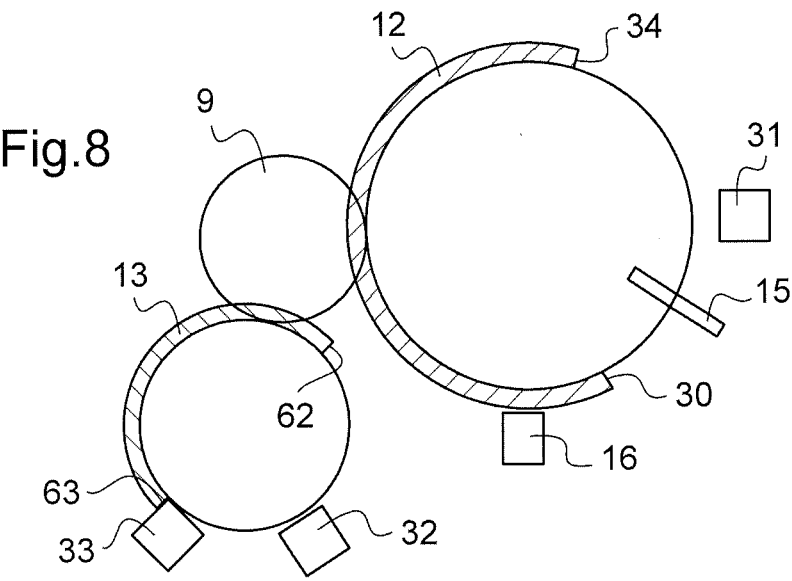

THREE-WAY VALVE WITH RETURN END-STOP ON THE AIR PATHWAY

The field of the present invention is that of motor vehicles and, more particularly, that of the equipment for powering the engine.

A motor vehicle heat engine comprises a combustion chamber, generally formed by a plurality of cylinders, in which a mixture of fuel and air is burned to generate the work of the engine. The air may be compressed or not, depending on whether the engine does or does not include a turbocharger. In the case of an engine with turbocharger, the air, compressed by the compressor, is taken into the engine where it is burned with the fuel then evacuated via the exhaust ducts. The exhaust gases drive a turbine, attached to the compressor and forming with it the turbocharger.

The intake air may also be mixed with exhaust gases; this introduces the concept of recirculated exhaust gases and of circulation of the gases along a so-called EGR (exhaust gas recirculation) loop. The gases taken into the combustion chamber are then called intake gases. A reduction of the polluting emissions, in particular in respect of nitrogen oxides, is thus obtained.

The recirculation of the exhaust gases can be called "low pressure" when it is applied to the exhaust gases tapped after the turbine and reintroduced before the compressor, or "high pressure" when it is applied with the gases tapped before the turbine and reintroduced after the compressor. As an example, the low-pressure recirculation is mainly used, on a petrol engine, to reduce the fuel consumption and obtain a better engine efficiency.

The gases are therefore conveyed by various ducts and their circulation is controlled using valves, which allow, inhibit or regulate their movements in these ducts. In the case of an EGR loop, so-called "three-way" valves have already been proposed. Such a valve can be arranged upstream of the compressor of the turbocharger, that is to say on the mixture intake duct, where it regulates the quantity of air circulating in said duct and the quantity of exhaust gas taken into the latter. The valve is then said to be arranged on the cold side of the engine because it is placed on the intake line rather than on the exhaust line.

For a three-way valve arranged on the cold side, a number of operating modes of the valve, and therefore of the engine, can be envisaged. The engine may receive only fresh air, with no recirculated exhaust gases. The engine may also receive fresh air mixed with a portion of the exhaust gases, the pressure difference between the exhaust and the intake of the engine then being sufficient to ensure the recirculation of the exhaust gases. When the pressure difference is not sufficient for the recirculation of the exhaust gases and to ensure the correct EGR rate, a back-pressure can be created by throttling the exhaust pathway downstream of the EGR loop, in order to thus force a portion of the exhaust gases towards the intake pathway of the engine. This solution, by its complexity, is not, however, very satisfactory, and it is preferable to use the EGR loop as follows.

With the flow rate of fresh air in the air inlet pathway of the EGR valve at maximum, the pathway for the EGR gases is progressively opened in the valve and, before the flow rate of the EGR gases in the valve stops increasing, the fresh air inlet pathway is progressively closed to continue to cause the flow rate of the EGR gases to increase, following an increasing monotonic curve.

A patent application has been filed by the applicant, under the number WO 2009/106727, which describes a three-way valve with two flaps in which the two flaps are arranged in the two inlet pathways of the valve and are actuated with a temporal offset by one and the same actuation means.

In this configuration, the flaps are driven by actuation means driven in rotation by control means and they are returned to their rest position by return springs mounted, either on the flap itself, or on its actuation means. In the case of a defect on the return spring of the air flap or of a hard point in its pivoting kinematic chain, this air flap risks remaining in the closed position, which degrades the performance of the engine. It is therefore appropriate to provide a device that makes it possible to maintain the operation of the engine, even in the case of a break of the return spring.

The aim of the present invention is to remedy these drawbacks. To this end, the subject of the invention is a valve comprising a first pathway, a first flap, arranged in said first pathway, control means and a first actuation means arranged to be controlled by the control means and drive said first flap from a first position to a second position, with a temporal phase shift such that, in a first stage, the first flap remains in said first position under the action of the return means.

According to the invention, said first actuation means comprises a return driving means making it possible to return the first flap to its first position under the action of the control means in the case of a failure of said return means.

It is thus possible to return the first flap to a position enabling the engine of the vehicle to continue to operate, even in the case of failure of the return spring. Only the polluting emissions reduction function will possibly be effected, the vehicle however being able to continue running until it is repaired.

According to different embodiments, which can be taken together or separately:

said first and second positions of the first flap are open and closed positions of the first pathway, the first actuation means comprises a toothed crown ring segment.

According to a first implementation:

the first actuation means also includes a control wheel, linked in rotation to the first flap and free in rotation relative to said toothed crown ring segment, said guide wheel being able to be driven by said toothed crown ring segment when said first flap switches from its first position to its second position, and by said return means, when said flap is actuated to return, said toothed crown ring segment comprises a return end-stop, capable of cooperating with a return end-stop of the control wheel in the case of a failure of said return means, said toothed crown ring segment comprises a driving end-stop, capable of cooperating with a driving end-stop of the control wheel, when said first flap switches from its first position to its second position, said return and driving end-stops of the control wheel bearing on one another.

According to another implementation:

said return driving means comprise a return end-stop formed by one end of said segment, said first actuation means also comprises a pawl circulating in a scallop formed in the toothed crown ring segment, the return end-stop being positioned facing said pawl.

According to one aspect of the invention, the return driving means positions the first flap set back relative to its first position when the control means are actuated to mitigate a failure of said return means. Possible interference, in normal operation, between the different end-stops, is thus avoided.

According to one aspect of the invention, said valve is of the three-way type and comprises a second flap, arranged in a second of the three pathways of the valve, and said control means are designed to be common to both flaps, said valve also comprising second actuation means, said second actuation means being arranged to be controlled by the common control means and drive the second flap such that, during said first stage, the common control means pivot the second flap from a first position to a second position.

The first and second actuation means can also be arranged so that, in a second stage, said control means, while continuing to pivot the second flap from its first position to its second position via the second actuation means, begin to pivot the first flap from its first position to its second position via the first actuation means.

The flaps are arranged, for example, in two inlet pathways of the valve and the latter is an EGR loop valve for the cold side, linked to the intake manifold of an internal combustion engine of a motor vehicle.

The invention will be better understood, and other aims, details, features and advantages thereof will become more clearly apparent from the following detailed explanatory description, of an embodiment of the invention given as a purely illustrative and nonlimiting example, with reference to the appended schematic drawings.

In these drawings:

FIG. 6 is a schematic diagram showing the three-way valve of FIGS. 3 to 5, in normal operation, in the position corresponding to FIG. 2a;

Figure 2A:
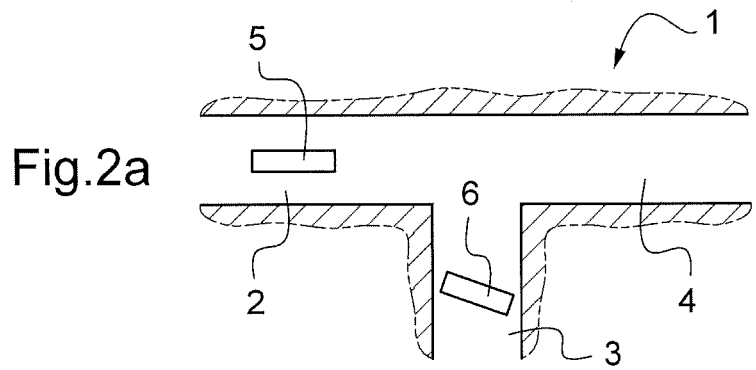
FIGS. 2a to 2d are schematic views showing, generically, the operation of a three-way valve of the EGR loop, with the different positions taken by its flaps.
Figure 2B:
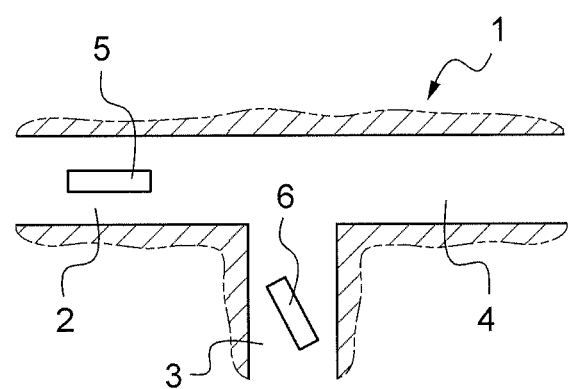
Figure 2C:
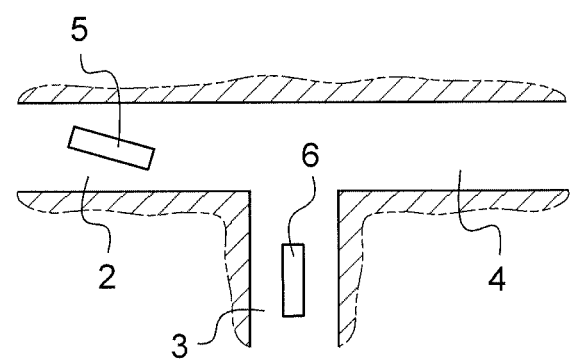
Figure 2D:
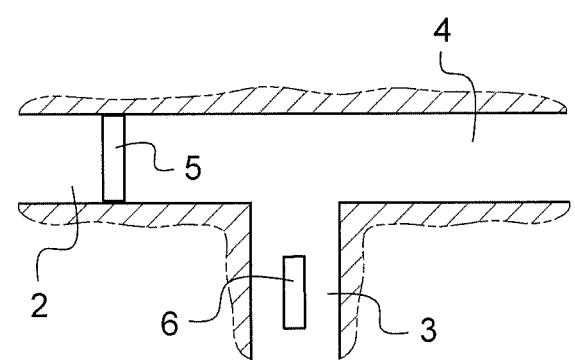
Figure 9:
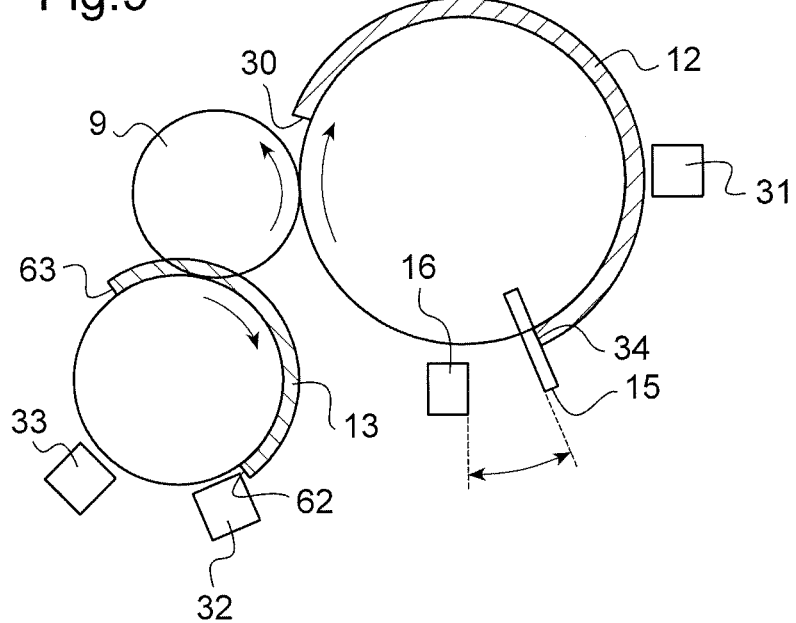
Figure 10:
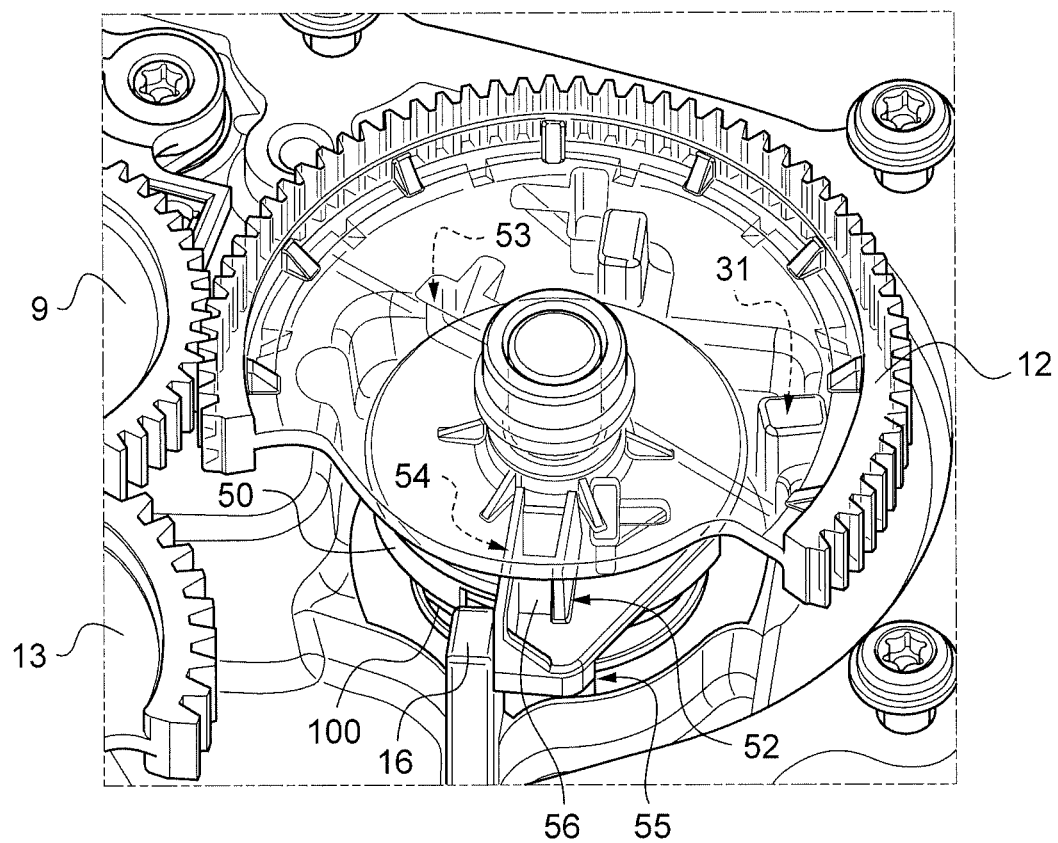

FIG. 7 is a schematic diagram showing the preceding three-way valve, in normal operation, in the position corresponding to FIG. 2d, FIG. 8 is a schematic diagram showing the preceding three-way valve, in the position corresponding to FIG. 2d, in the case of a first type of failure, FIG. 9 is a schematic diagram showing the preceding three-way valve, in a filled position following a second type of failure, and FIG. 10 is a partial perspective view of a second implementation of a three-way valve according to the invention.

Figure 1:
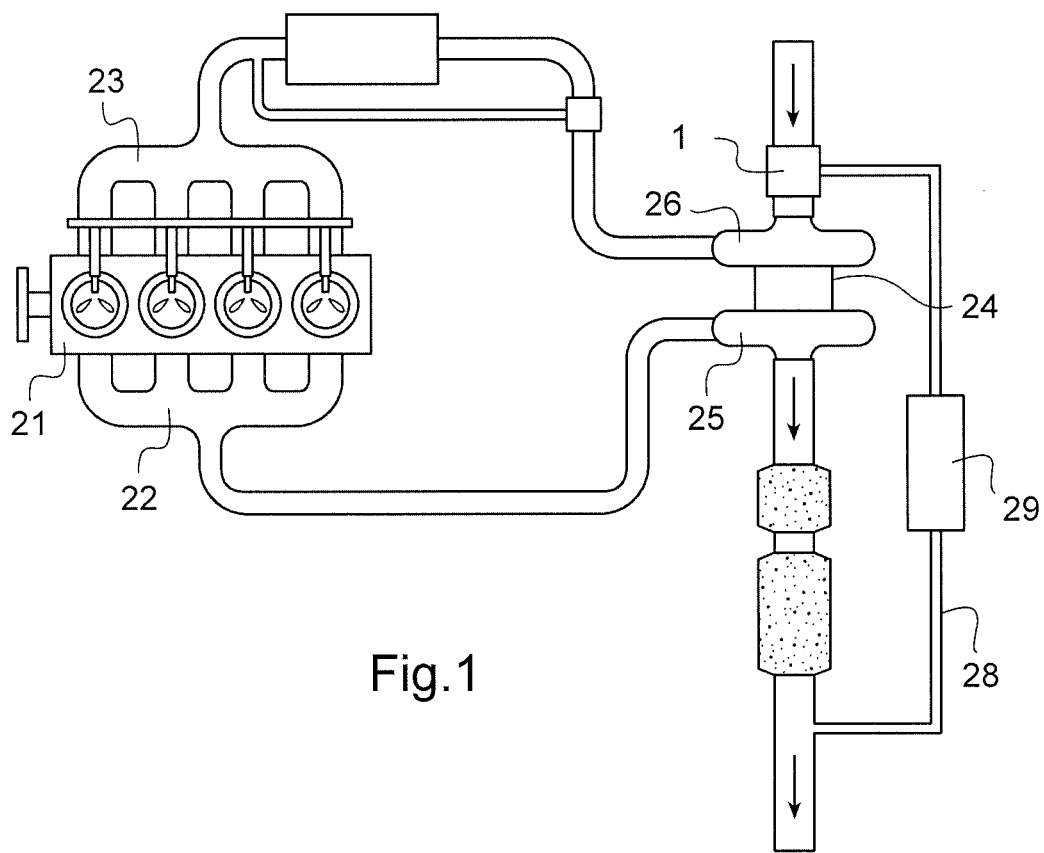
FIG. 1 is a schematic view of an EGR loop installed on a turbocharged engine, according to the prior art.

Referring to FIG. 1, this shows an internal combustion engine 21 of a motor vehicle, provided with an exhaust gas recirculation (EGR) loop, comprising an intake manifold 23 for the engine to receive air and exhaust gases coming from a compressor 26 of a turbocharger 24, an exhaust manifold 22 for the combustion gases, a turbine 25 of the turbocharger 24 and the EGR loop 28, with a cooler 29 and the low-pressure three-way valve 1 which is arranged upstream of the compressor 26 of the turbocharger 24. This three-way valve is linked to the compressor by its outlet and has two inlets for receiving fresh air (air pathway) and the cooled exhaust gases (EGR pathway or gas pathway), in a mixture whose pressure is increased by the compressor 26.

FIGS. 2a to 2d schematically represent the three-way valve 1, with its air inlet 2, its recirculated exhaust gas inlet 3 and an outlet for the air and gas mixture 4. The valve 1 is, here, a valve with two flaps, one flap 5 in the air inlet pathway 2 and one flap 6 in the gas inlet pathway 3. The operation of the valve, when it concerns enabling the EGR loop, is as follows: at the outset, the air flap 5 is in an angular position (0°) allowing for a maximum air flow rate in the pathway 2 and the gas inlet flap 6 is in an angular position (90°) blocking the pathway 3. This situation is the one in which the engine is running, for example, when stopped and idling.

The enabling of the loop is reflected in a start of pivoting of the gas inlet flap 6, without the air flap 5 pivoting, thus progressively opening the pathway 3 to the EGR exhaust gases (FIG. 2a). With the air flap 5 still remaining in the same maximum open position of the air inlet 2, the gas flap 6 continues to pivot to considerably open the gas pathway 3 (FIG. 2b). In a certain angular position of the gas flap 6, here 35°, that is to say, after a rotation of 55°, the flow rate of the EGR gases in the pathway 3 to all intents and purposes stops increasing and, while continuing to pivot the gas flap 6, the air flap 5 is then made to begin to pivot to close the air inlet pathway 2 and thus force the engine to suck in more EGR gas (FIG. 2c). This phase can continue to an extreme position in which the gas flap 6 reaches the maximum open angular position (0°) of the gas inlet pathway 3 and in which the air flap is in the angular position (90°) blocking the air inlet pathway 2 (FIG. 2d).

A kinematic chain allowing for the implementation of a three-way valve 1 according to the invention, operating according to the principle defined above, will now be described with reference to FIGS. 3 to 5.

The kinematic chain of the three-way valve 1 comprises a gear system extending, here, between a direct current motor 7 and two shafts 51, 61 driving, in rotation, respectively the air flap 5 and the gas flap 6. The two shafts 51, 61 extend parallel to one another. The shaft 14 of the electric motor 7 has a pinion 8 attached to it driving an intermediate toothed wheel 9 which has peripheral teeth 10 and central teeth 11. The peripheral teeth 10 of the intermediate wheel mesh with a toothed crown ring 12 driving the air flap 5 in rotation. The toothed crown ring 12 is free in rotation relative to the axis 51 of the flap 5. The driving of this flap 5 in rotation by the crown ring 12 is obtained via a drive pawl 15 which is rotationally attached to the axis 51 of the flap 5. This pawl 15 is arranged resting against an adjustable end-stop, or bottom air end-stop 16, which is attached to the body of the valve (not represented). The crown ring 12 includes an angular scallop 17 designed to allow the free rotation of the crown ring 12 over a defined angular portion without driving the pawl 15, and therefore without driving the flap 5. It is when the crown ring 12 is driven in rotation beyond this angular portion that a first edge of the scallop 17, forming a driving end-stop 30, then drives the pawl 15. As will be explained in more detail later, the opposite edge of the scallop 17 of the crown ring 12 also forms an end-stop, called return end-stop 34.

The central teeth 11 of the intermediate wheel 9 mesh with a toothed crown ring 13 driving the gas flap 6 in rotation. The toothed crown ring 13 is attached in rotation to the axis 61 of the flap 6. It extends circularly only over an angular portion, the ends of which have radial faces suitable for cooperating with parts attached to the body of the valve, which form end-stops for the circular displacement of the toothed crown ring 13, as will be explained later.

In normal mode, under the action of the motor 7, the flap 6 is therefore driven in rotation directly by the rotation of the crown ring 13, while the flap 5 is driven in rotation only when the crown ring 12 is driving the pawl 15 in rotation.

In the example considered, the electric motor 7, via its pinion 8 when it is driven in rotation in the counter-clockwise direction, drives the intermediate wheel 9 in rotation in the clockwise direction. In its turn, the wheel 9, by its teeth 10, 11, drives, in the counter-clockwise direction, the two toothed crown rings 12, 13 which are therefore driven in rotation by the same intermediate wheel 9, but via two different sets of teeth 10, 11. As an example, the meshing ratio between the shaft 14 of the electric motor 7 and the gas flap 6 is here approximately 16, whereas the ratio between the shaft 14 and the air flap 5 when it is driven is approximately 7.

The mechanism for phase-shifting the closure of the air flap 5 will now be described, in relation to FIGS. 3, 4 and 5 which show the toothed crown rings and wheels at different steps in the rotation of the pinion 8.

Figure 3:
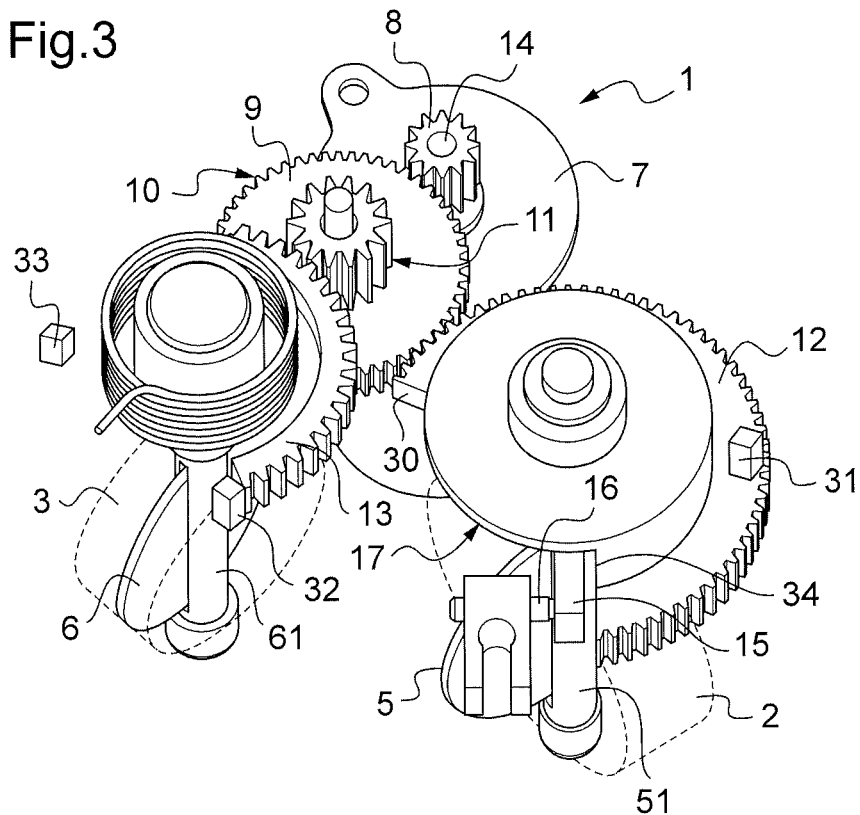
FIGS. 3 to 5 show the control devices for the two flaps of a first implementation of a three-way valve according to the invention, in the positions corresponding to the cases represented respectively in FIGS. 2a, 2b and 2d.
Figure 4:
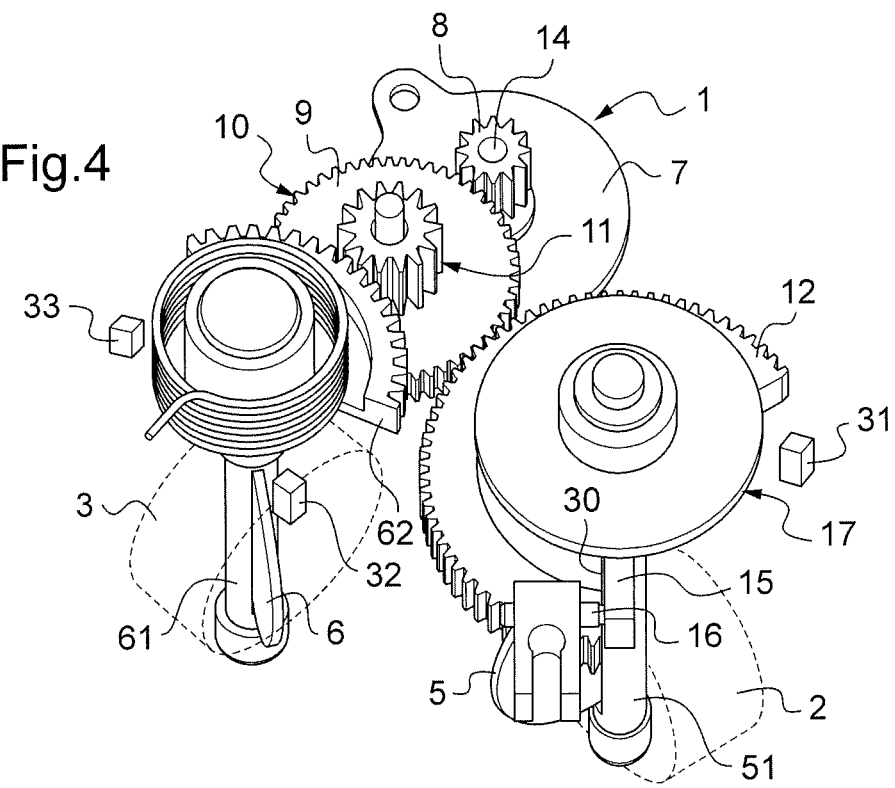

From FIG. 3 to FIG. 4, the crown rings 12 and 13 are driven in the counter-clockwise direction so as to cause the gas flap 6 to open, whereas the air flap 5 remains immobile, and does so by virtue of the angular scallop 17. In the position of FIG. 4, the edge of this scallop 17 which forms the driving end-stop 30, comes into contact with the pawl 15. The rotation of the crown ring 12 then continues toward the position represented in FIG. 5, the pawl 15 (and consequently the flap 5) then being driven in rotation by the driving end-stop 30. The air flap 5 therefore closes with a temporal phase-shift relative to the gas flap 6, by virtue of the presence of the scallop 17.

Figure 5:
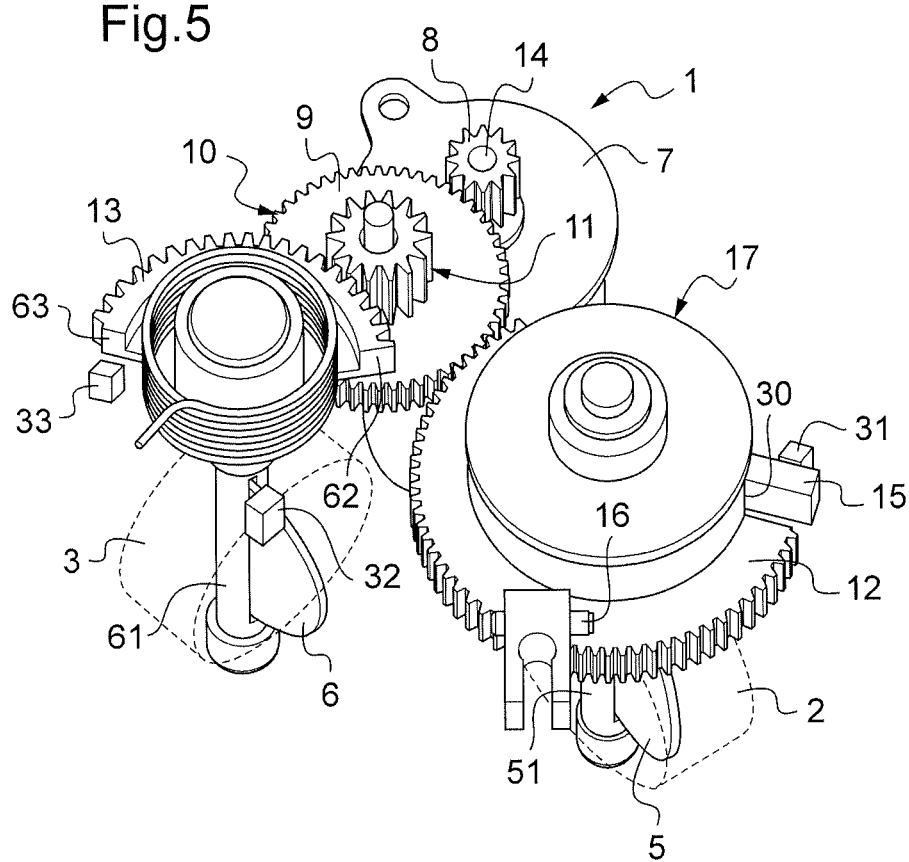

FIGS. 3 to 5 also represent a number of end-stops associated with the toothed crown rings 12 and 13. On the air pathway, there is a top air end-stop 31, attached to the body of the valve 1, which corresponds to the extreme position that the pawl 15 reaches when the air flap 5 is in the fully closed position. The pawl 15, in normal operation, is thus displaced, in one direction under the action of the driving end-stop 30 and in the other direction under the action of a return spring (not represented), between the bottom air end-stop 16 and the top air end-stop 31. This displacement corresponds to a rotation of the air flap 5 between the fully open position and the fully closed position. It will also be noted in FIG. 3 that the toothed crown ring 12 driving the air flap 5 and the return end-stop 34 do not come into contact with the driving pawl 15, which is returned against the bottom air end-stop 16, when the three-way valve is in the configuration of FIG. 2a (air flap open and gas flap closed). The kinematic chain of the toothed wheels and crown rings is such that it leaves a gap between the return end-stop 34 and the bottom air end-stop which is greater than the thickness of the driving pawl 15. The utility of this gap will be detailed later, in relation to FIG. 9.

In parallel, there are, on the EGR pathway, two end-stops, a bottom gas end-stop 32 and a top gas end-stop 33 associated with the extreme positions that can be assumed, respectively, by the first 62 and the second 63 ends of the toothed crown ring 13 driving the gas flap 6.

Figure 6:
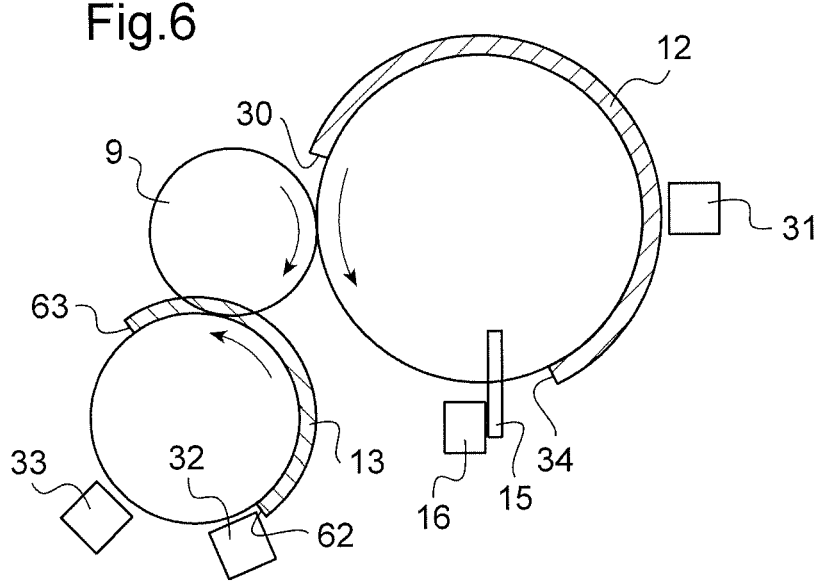

The function of the above end-stops will be better explained, in relation to FIGS. 6 to 9 which are representative of the operation of a three-way valve according to the invention. In these figures, the central teeth 11 and the peripheral teeth 10 of the intermediate toothed wheel 9 have been combined in order to simplify the drawing. FIG. 6 corresponds to an operation of the valve 1 in normal mode, in the configuration of FIG. 2a, that is to say, air flap 5 fully open and gas flap 6 fully closed. FIG. 7 corresponds to an operation of the valve 1 in normal mode, in the configuration of FIG. 2d, that is to say, air flap 5 fully closed and gas flap 6 fully open. As for FIG. 8, it represents a first defective operating mode in which the air flap 5 is no longer driven, the pawl 15 not reaching the top air end-stop 31, and in which the gas flap 6 goes beyond the fully open position, the second end 63 of its toothed crown ring 13 then arriving in end-stop against the top gas end-stop 33. Finally, FIG. 9 represents a second defective operating mode, in which the air flap 5 is no longer returned to the fully open position, the return spring being assumed to have broken or else a hard point in the kinematic chain of the air pathway preventing the return of the pawl 15 solely under the force exerted by this spring.

The operation of the invention is described, firstly in the normal mode with reference to FIGS. 6 and 7, then in the defective mode corresponding to FIG. 9.

FIG. 6 represents the situation of the elements of the valve 1 in the configuration of FIG. 2a, that is to say before the introduction of recirculated gases. The intermediate toothed wheel 9 has brought the first end 62 of the crown ring 13 driving the gas flap to abut against the bottom gas end-stop 32, which corresponds to the fully closed position for the gas flap 6. In parallel, the toothed crown ring 12 driving the air flap is in a position such that its driving end-stop 30 is separated from the driving pawl 15; the latter bears against the adjustable end-stop 16, under the action of the return spring which tends to return the air flap 5 to its fully open position. Its return end-stop 34, although the toothed crown ring 12 is in one of its extreme angular positions, is not in contact with the driving pawl 15.

The enabling of the recirculation of the gases is reflected in a rotation of the intermediate toothed wheel 9. On the one hand this rotation causes the toothed crown ring 13 of the gas flap to rotate and moves its first end 62 away from the bottom gas end-stop 32 to bring its second end 32 closer to the top gas end-stop 33, but without reaching it; on the other hand it causes the toothed wheel 12 of the air flap to rotate so that it, initially, approaches the driving end-stop 32 of the pawl 15 then, in a second stage drives the latter in rotation until it bears against the top air end-stop 31. The situation of the valve 1 is then the one represented in FIG. 7, which corresponds to the case of FIG. 2d, with the air flap 5 fully closed and the gas flap 6 fully open.

It can be seen in FIG. 7 that the rotation of the intermediate toothed wheel 9 is blocked by the bearing of the pawl 15 against the top air end-stop 31 and that it cannot continue its rotation. In this situation, the invention provides for the kinematic chain of the toothed wheels to be such that the second end 63 of the toothed crown ring 13 does not come into contact with the top gas end-stop 33, but that a gap remains between them. This gap is not designed to be cancelled, as long as the valve is in its normal operating mode.

FIG. 8 represents the operation of the valve 1 in the first case mentioned of malfunction, that is to say, that of a break of the teeth in the kinematic chains, of a clutch problem or of a break of the driving pawl 15. There is then no longer a one-to-one link between the meshings of the toothed crown rings 12 and 13. Because of the break in the driving of the pawl 15 by the intermediate toothed wheel 9, the latter does not come into end-stop against the top air end-stop, or if it is there, it does not offer any resistance to a continuation of the rotation of the intermediate wheel 9. The latter therefore drives the toothed crown ring 13 driving the gas flap beyond the fully open position of the gas flap 6 and its second end 63 strikes the top gas end-stop 33.

A sensor sensing the position of the gas flap 6, placed somewhere on the EGR pathway, whether on the flap 6, its axis 61 or the toothed crown ring 13, will be able to detect this additional rotation of the toothed crown ring and to trigger an air pathway failure alert.

A method for diagnosing the correct operation of the air pathway may also be put in place, by virtue of a three-way valve configured according to the invention.

It consists in initiating a rotation of the intermediate toothed wheel 9 so that the toothed crown ring 13 driving the gas flap performs a complete travel, from the position where its first end 62 is on the bottom gas end-stop 32 and where the gas flap 6 is in the fully closed position, to the fully open position of this flap. In the case where the air pathway is healthy, the rotation of the toothed wheel 9 will be stopped upon the contact of the driving pawl 15 with the top air end-stop 31 and the sensor will detect a position of the gas flap 6 corresponding to the fully open position. Otherwise, the pawl will not be driven and will provide no blockage of the intermediate wheel 9; the latter will drive the toothed crown ring 13 which will go beyond the fully open position of the gas valve 6 and will be stopped only by its second end 63 coming upon the top gas end-stop 33. By this excessive rotation, the sensor sensing the position of the gas flap will then detect the failure that has occurred on the air pathway. Such a diagnostic method is applied, for example, each time the vehicle is started up and any failure will be signalled to the driver by an indication on the dashboard.

Another means for detecting a failure of the air pathway may be created by fitting a contact detector between the second end of the toothed crown ring 13 and the top gas end-stop 33.

FIG. 9 represents the position that is given to the valve 1 in the second case of malfunction mentioned, in which the pawl 15 is no longer returned against the bottom air end-stop 16. Such a case can, for example, occur following a break of the return spring or else the occurrence in the control chain, of a hard point that the force exerted by the return spring cannot overcome.

In this case, the actuation of the electric motor 7 to return to the position corresponding to FIG. 2a will result in a rotation of the toothed crown ring 12 driving the air flap 5 in the clockwise direction and the return of the end of its scallop forming the return end-stop 34 toward the bottom air end-stop 16. That done, this return end-stop drives the pawl 15 toward the bottom air end-stop 16, from the point where it is blocked, and brings the air flap 5 into a position close to its fully open position. In other words, use is made of the torque developed by the electric motor 7 to mitigate the failure of the spring. The vehicle engine can therefore continue to function despite the failure observed on the operation of the three-way valve.

A gap is, however, left between the pawl 15 and the bottom air end-stop 16 so that, in normal operation, the return end-stop 34 does not interfere, for example under the action of vibrations, with the positioning of the driving pawl 15.

FIG. 10 illustrates a variant embodiment of the means for actuating the air pathway. In the latter, there are the toothed crown ring segment 12, represented transparently, and the return spring, the turns 100 of which are partially visible, accompanied by a control wheel 50. The latter is linked in rotation to the air flap, not represented, and free in rotation relative to the toothed crown ring segment 12.

Said guide wheel 50 is able to be driven by said toothed crown ring segment 12, when said air flap switches from its fully open position to its fully closed position, and by the return spring, when said air flap is actuated in return mode and always with a temporal phase-shift relative to the gas flap 6, not represented in this figure.

For this, said toothed crown ring segment 12 comprises a driving end-stop 53, capable of cooperating with a driving end-stop 54 of the control wheel 50, when said air flap 5 switches from its fully open position to its fully closed position. More specifically, as illustrated in FIG. 10, said toothed crown ring segment 12 is configured so that its driving end-stop 53 is angularly set back from the driving end-stop 54 of the control wheel 50 in a first phase of rotation of said toothed crown ring segment 12, corresponding to the switching of the valve from the configuration of FIG. 2a to that of FIG. 2b. The two driving end-stops 53, 54 then come into contact and, in a second phase of rotation of the toothed crown ring segment 12, the latter drives the control crown ring 50. In other words, in this second phase, the air flap is driven by the motor of the valve from its fully open position to its fully closed position.

In the reverse direction of rotation, in normal mode, the spring drives the control wheel 50 which presses the driving end-stop 54 of said control wheel against the bottom air end-stop 16 in the fully open position of the air flap, as is illustrated in FIG. 10. The bottom air end-stop 16 is here made of the same material as the body of the valve. The driving end-stop 54 has a radial extension to cooperate with the bottom air end-stop 16.

The top air end-stop 31 that makes it possible to deal with the first case of malfunction mentioned, that is to say that of a break of the teeth of the kinematic chains, can also be seen in this figure. Said top air end-stop 31 is here made of the same material as the valve body. For the same purpose, the control wheel 50 is provided with a diagnostic end-stop 55 and said control wheel 50 and said valve body are configured so that said top air end-stop 31 and said diagnostic end-stop 55 come into contact in said first case of malfunction.

In order to avoid interference between end-stops, said diagnostic end-stop 55 is situated, for example, on the face of the control wheel 50 opposite those provided with the driving end-stop 54 and/or at the periphery of said control wheel 50.

To deal with the second case of malfunction, said toothed crown ring segment 12 here comprises a return end-stop 71, capable of cooperating with a return end-stop 52 of the control wheel 50 in the case of a failure of said return means.

As in the preceding embodiment, said return end-stops 51, 52 have an angular offset when the air flap 5 is in its fully open position, as illustrated in FIG. 10.

Said return end-stop 52 of the control wheel 50 is here placed in the angular extension of the driving end-stop 54 of said control wheel and/or on the same face of said wheel as the latter. Said return 52 and driving 54 end-stops of the control wheel can bear on one another using a spacer 56.

The invention has been described with a three-way valve used in the context of an EGR loop, with progressive opening of the EGR pathway followed by a closure, with a temporal offset, of the air pathway. It can perfectly well be implemented on any type of valve comprising, on one of its pathways, a flap that is driven, in normal mode, by a motor in a first direction and by a return spring in a second direction, in order to mitigate a failure of the return spring. In particular, it will be able to be used in a three-way valve, used in another application, notably with different directions for the opening and the closing of the flaps.

The invention claimed is:

1. A valve comprising:
   a first pathway;
   a second pathway;
   a first flap, arranged in said first pathway;
   a second flap, arranged in said second pathway;
   a kinematic chain; and
   a first actuator arranged to be controlled by the kinematic chain and configured to drive said first flap from a first position to a second position with a temporal phase shift relative to the second flap, and in a first stage of the driving, the first flap remains in said first position under the action of a return spring,
   wherein said first actuator comprises a return driving end-stop for returning the first flap to the first position under the action of the kinematic chain in the case of a failure of said return spring.

2. The valve according to claim 1, wherein said first and second positions of the first flap are open and closed positions of the first pathway, respectively.

3. The valve according to claim 1, wherein the first actuator further comprises a toothed crown ring segment.

4. The valve according to claim 3, wherein the first actuator further comprises a guide wheel, linked in rotation to the first flap and free in rotation relative to said toothed crown ring segment, said guide wheel being driven by said toothed crown ring segment when said first flap switches from the first position to the second position, and by said return spring, when said first flap is actuated to return.

5. The valve according to claim 4, wherein said toothed crown ring segment further comprises a first return end-stop capable of cooperating with a second return end-stop of the control wheel in the case of a failure of said return spring.

6. The valve according to claim 5, wherein said toothed crown ring segment further comprises a first driving end-stop, capable of cooperating with a second driving end-stop of the control wheel, when said first flap switches from the first position to the second position, said first and second return and driving end-stops of the control wheel bearing on one another.

7. The valve according to claim 1, wherein the return driving end-stop positions the first flap set back relative to the first position when the kinematic chain is actuated to mitigate a failure of said return spring.

8. The valve according to claim 7, in which the first and second pathways are inlet pathways, the valve then being an exhaust gas recirculation (EGR) loop valve for a cold side, linked to an intake manifold of an internal combustion engine of a motor vehicle.

9. The valve according to claim 1, said valve being of the three-way type, wherein
the second flap is arranged in the second of three pathways of the valve, and in which said kinematic chain is designed to be common to the first and second flaps, said valve further comprises a second actuator, said second actuator being arranged to be controlled by the common kinematic chain and drives the second flap such that, during said first stage of the driving, the common kinematic chain pivots the second flap from a first position to a second position.

10. The valve according to claim 9, wherein the first and second actuators are arranged so that, in a second stage, said kinematic chain, while continuing to pivot the second flap from the first position to the second position via the second actuator, begin to pivot the first flap from the first position to the second position via the first actuator.

* * * * *